US009222608B2

(12) United States Patent
Teshima et al.

(10) Patent No.: US 9,222,608 B2
(45) Date of Patent: Dec. 29, 2015

(54) RESINOUS TUBE JOINT

(75) Inventors: Kazukiyo Teshima, Sanda (JP); Akihiro Masuda, Sanda (JP); Takehiro Nakamura, Sanda (JP); Masateru Yamada, Sanda (JP); Takayuki Kishimoto, Sanda (JP); Toshiyuki Fukumoto, Sanda (JP); Takeshi Nakagawa, Fukuchiyama (JP); Ryo Imanishi, Sanda (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 654 days.

(21) Appl. No.: 13/057,090

(22) PCT Filed: Jul. 14, 2009

(86) PCT No.: PCT/JP2009/062748
§ 371 (c)(1),
(2), (4) Date: Apr. 29, 2011

(87) PCT Pub. No.: WO2010/016364
PCT Pub. Date: Feb. 11, 2010

(65) Prior Publication Data
US 2011/0210544 A1    Sep. 1, 2011

(30) Foreign Application Priority Data

Aug. 5, 2008  (JP) ................................. 2008-202373
Nov. 27, 2008 (JP) ................................. 2008-302137

(51) Int. Cl.
*F16L 19/028* (2006.01)
*F16L 47/04* (2006.01)
*F16L 19/04* (2006.01)

(52) U.S. Cl.
CPC ............. *F16L 19/0283* (2013.01); *F16L 19/04* (2013.01); *F16L 47/04* (2013.01); *F16L 2201/10* (2013.01)

(58) Field of Classification Search
CPC ........ F16L 47/04; F16L 19/0283; F16L 19/04
USPC ................ 285/247, 332, 332.1–332.2, 334.5
See application file for complete search history.

(56) References Cited

U.S. PATENT DOCUMENTS 5,154,453 A * 10/1992 Nishio ........................... 285/342
5,332,271 A    7/1994 Grant et al.
5,388,871 A *  2/1995 Saitoh ........................... 285/247
5,472,244 A   12/1995 Nishikata et al.

(Continued)

FOREIGN PATENT DOCUMENTS

EP    1 521 028    4/2005
EP    1 719 941   11/2006

(Continued)

OTHER PUBLICATIONS

European Search Report dated Jan. 16, 2014.

(Continued)

*Primary Examiner* — James Hewitt
(74) *Attorney, Agent, or Firm* — Rankin, Hill & Clark LLP (57) ABSTRACT

A resin pipe joint including: a synthetic resin-made joint body including an inner cylinder portion, an external thread portion, and a radial groove m into which an end of a tube enters; and a union nut that is made of a transparentable fluorine resin, and the union nut including an internal thread portion, a seal peripheral edge which presses a tip end portion of a tube flared portion, a slipping-off prevention peripheral edge which is actable on a large-diameter portion of a flaring changing region, and a pressing inner peripheral portion which is externally fittable to a flared straight portion.

12 Claims, 6 Drawing Sheets

(56) References Cited

U.S. PATENT DOCUMENTS

| | | | |
|---|---|---|---|
| 5,553,900 A | | 9/1996 | Fukumoto et al. |
| 5,951,060 A | * | 9/1999 | Fukano et al. .................. 285/92 |
| 6,022,053 A | * | 2/2000 | Hukuda ........................ 285/331 |
| 6,435,568 B1 | * | 8/2002 | Fukano et al. ................. 285/331 |
| 7,240,925 B2 | * | 7/2007 | Fukano et al. ................. 285/247 |
| 2004/0100097 A1 | | 5/2004 | Fukano et al. |
| 2011/0221190 A1 | * | 9/2011 | Teshima et al. ............... 285/354 |
| 2011/0260450 A1 | * | 10/2011 | Imanishi et al. ........... 285/334.5 |

FOREIGN PATENT DOCUMENTS

| | | |
|---|---|---|
| JP | 4-248095 | 9/1992 |
| JP | 7-27274 | 1/1995 |
| JP | 7-12692 | 3/1995 |
| JP | 3041899 | 7/1997 |
| JP | 2587449 | 10/1998 |
| JP | 10-318475 | 12/1998 |
| JP | 2002-357294 | 12/2002 |
| JP | 2004-176760 | 6/2004 |
| JP | 2007-333127 | 12/2007 |
| WO | 01/94833 | 12/2001 |

OTHER PUBLICATIONS

Supplementary European Search Report dated Apr. 8, 2013.

* cited by examiner

| Fitting length : L | Determination |
|---|---|
| 5 mm | ○ |
| 10 mm | ◎ |
| 15 mm | ◎ |

Resistance against pulling    equal to or larger than 80kg   ··· ○

Resistance against pulling    equal to or larger than 90kg   ··· ◎

RESINOUS TUBE JOINT

CROSS-REFERENCE TO RELATED APPLICATIONS

This application is a National Phase Application of International Application No. PCT/JP2009/062748, filed Jul. 14, 2009, which claims the priority of Japan Patent Application Nos. 2008-202373, filed Aug. 5, 2008 and JP 2008-302137, filed Nov. 27, 2008. The present application claims priority from these applications and each of these applications is herein incorporated in their entirety by reference.

TECHNICAL FIELD

The present invention relates to a resinous tube joint, i.e., a resin pipe joint having a structure to which a tube functioning as a fluid transfer path is connected while flaring the tube, and more particularly to a resin pipe joint which is preferred also in piping for a liquid having high purity or ultrapure water to be handled in a production process of various technical fields such as production of semiconductor devices, production of medical equipment and medicines, food processing, and chemical industry, and which is used as means for connecting a fluid apparatus such as a pump, a valve, or a filter, or a tube that is a fluid transfer path.

BACKGROUND ART

As a resin pipe joint of this kind, a tube joint disclosed in Patent Literature 1 is known. Namely, the tube joint is structured in the following manner. A synthetic resin-made tube 1 is forcedly pressed onto an inner cylinder portion 5 of a joint body 4, or, as shown in FIG. 2 of Patent Literature 1, a tube end portion 2 is previously flared and then fitted to the inner cylinder portion 5. Then, a union nut 6 which is previously fitted to the tube is screwed with the joint body, and forcedly moved in the axial direction of the joint body 4 by performing a fastening operation, whereby a flaring base portion 2a of the tube 1 is strongly pressed in the axial direction by an edge portion 6a to seal between the tube 1 and the inner cylinder portion 5.

As a structure similar to the above-described structure, a structure disclosed in FIGS. 8 and 9 of Patent Literature 2, and a resin pipe joint disclosed in FIG. 6 of Patent Literature 3 are known. As shown in these figures, a joint structure in which the tip end of a tube is flared, externally fitted to a joint body, and fastened by a nut has an advantage that a good sealing function is obtained although a pipe joint is economically configured by a small number (two) of components, i.e., the joint body and a union nut, as compared with a structure disclosed in FIG. 5 of Patent Literature 2, FIG. 5 of Patent Literature 3, and the like, i.e., a pipe joint having a three-component structure in which an end of a tube that is flared and externally fitted to an inner ring that is a dedicated component is fitted into a tubular receiving port of a joint body, and fastened by a union nut.

In a conventional resin pipe joint which is configured by two components as described above, however, an end of a tube is flared and firmly fitted, and a flaring base portion is fastened by a union nut, and, probably because the fastening is performed in order to attain a sealing function, there is a tendency that the joint is relatively weak against a force of pulling the tube out of a joint body. A pulling movement itself of a tube is problematic. There is a further problem in that this movement causes also a seal point due to the pressing by an edge portion to be shifted, and the sealing property is adversely influenced. In the case where, in order to handle a high-temperature fluid of 100° C. or higher, a resin pipe joint is formed by a resin material having a large coefficient of expansion such as a fluorine resin, particularly, these problems become more noticeable.

As disclosed in Patent Literature 4, therefore, it is known that a resin pipe joint which exerts not only a sealing function but also a resistance against pulling of a tube is obtained by disposing pulling resistant means having a structure in which a C-like split ring is interposed between a flared portion of the tube and a union nut in a state where the ring is fitted into a peripheral groove of the tube flared portion. In the resin pipe joint disclosed in Patent Literature 4, however, preprocessing of previously forming the peripheral groove in the tube flared portion is necessary, and the number of components is increased to three. Therefore, there arises a new problem in that the economical advantage which is originally provided in such a resin pipe joint is impaired. In order that a resin pipe joint configured by two components or a joint body and a union nut is formed so as to have a high resistance against pulling without causing the new problem, consequently, there remains room for further improvement.

PRIOR ART LITERATURE

Patent Literature

Patent Literature 1: Japanese Utility Model Registration No. 3,041,899
Patent Literature 2: Japanese Patent Application Laid-Open No. 7-27274
Patent Literature 3: Japanese Patent Application Laid-Open No. 2002-357294
Patent Literature 4: Japanese Utility Model Registration No. 2,587,449

SUMMARY OF THE INVENTION

Problem to be Solved by the Invention

In view of the above-discussed circumstances, it is an object of the invention to provide a resin pipe joint in which, although an economical configuration formed by two components or a joint body and a union nut is employed, both a resistance against pulling and an excellent sealing property can be attained.

Means for Solving the Problem

In one embodiment, the invention characterized in that a resin pipe joint has: a synthetic resin-made joint body 1 including an inner cylinder portion 4 to which an end portion of a synthetic resin-made tube 3 is externally fittable and attachable while being flared, a cover cylinder portion 6 which is put over an inner deep side of the inner cylinder portion 4 with forming a radial gap m that allows the tube 3 to be inserted, and an external thread portion 5; and a union nut 2 that is made of a transparentable synthetic resin, and that includes: an internal thread portion 8 which is screwable with the external thread portion 5; a seal pressing portion 10 which is actable on a small-diameter portion of a flaring changing region 9 in a flared portion 3A of the tube 3, the flared portion being externally fitted to the inner cylinder portion 4; and a pressing inner peripheral portion 13 which is externally fittable to a flared straight portion 12 of the flared portion 3A, the flared straight portion surrounding a constant-diameter straight barrel cylinder portion 4B, and the resin pipe joint is set so that, by a screw advancement of the union nut 2 in a direction of an axis P of the joint body 1, the screw advancement being caused by screwing the internal thread portion 8 to the external thread portion 5 in a state where the tube 3 is externally fitted and attached to the inner cylinder portion 4 and the flared portion 3A is formed, the pressing inner peripheral portion 13 is pressingly contacted with and externally fitted to the flared straight portion 12, and the small-diameter portion of the flaring changing region 9 is pressed in the direction of the axis P by the seal pressing portion 10.

In one embodiment, the invention is characterized in that the pressing inner peripheral portion 13 is pressingly contacted with and externally fitted to the flared straight portion 12 in a degree in which a radial gap is not formed between the pressing inner peripheral portion and the flared straight portion 12, and co-rotation of the flared portion 3A due to fastening of the union nut 2 does not occur.

In one embodiment, the invention is characterized in that a slipping-off prevention pressing portion 11 which is actable on a large-diameter portion of the flaring changing region 9 is disposed in the union nut 2, and the resin pipe joint is set so that, by the screw advancement of the union nut 2, a portion of the large-diameter portion of the flaring changing region 9 is pressed in the direction of the axis P by the slipping-off prevention pressing portion 11.

In one embodiment, the invention is characterized in that a resin pipe joint has:

a synthetic resin-made joint body 1 including an inner cylinder portion 4 to which an end portion of a synthetic resin-made tube 3 is externally fittable and attachable while being flared, and an external thread portion 5; and a synthetic resin-made union nut 2 including: an internal thread portion 8 which is screwable with the external thread portion 5; a seal pressing portion 10 which is actable on a small-diameter portion of a flaring changing region 9 in a flared portion 3A of the tube 3, the flared portion being externally fitted to the inner cylinder portion 4; a slipping-off prevention pressing portion 11 which is actable on a large-diameter portion of the flaring changing region 9; and a pressing inner peripheral portion 13 which is externally fittable to a flared straight portion 12 of the flared portion 3A, the flared straight portion surrounding a constant-diameter straight barrel cylinder portion 4B, and the resin pipe joint is configured so that, by a screw advancement of the union nut 2 in a direction of an axis P of the joint body 1, the screw advancement being caused by screwing the internal thread portion 8 to the external thread portion 5 in a state where the tube 3 is externally fitted and attached to the inner cylinder portion 4 and the flared portion 3A is formed, the pressing inner peripheral portion 13 is pressingly contacted with and externally fitted to the flared straight portion 12, the large-diameter portion of the flaring changing region 9 is pressed in the direction of the axis P by the slipping-off prevention pressing portion 11, and the small-diameter portion of the flaring changing region 9 is pressed in the direction of the axis P by the seal pressing portion 10, and set so that, after start of the pressing of the large-diameter portion by the slipping-off prevention pressing portion 11, the pressing of the small-diameter portion by the seal pressing portion 10 is started.

In one embodiment, the invention is characterized in that the pressing inner peripheral portion 13 is pressingly contacted with and externally fitted to the flared straight portion 12 in a degree in which a radial gap is not formed between the pressing inner peripheral portion and the flared straight portion 12, and co-rotation of the flared portion 3A due to fastening of the union nut 2 does not occur.

In one embodiment, the invention is characterized in that a cover cylinder portion 6 which is put over an inner deep side of the inner cylinder portion 4 with forming a radial gap m that allows the tube 3 to be inserted is formed in the joint body 1, and the union nut 2 is made of a transparentable synthetic resin.

In one embodiment, the invention is characterized in that the inner cylinder portion 4 is formed by an end-tapered cylinder portion 4A which causes the tube 3 to be gradually flared, and the straight barrel cylinder portion 4B which is formed in succession to a large-diameter side of the end-tapered cylinder portion 4A, and the flaring changing region 9 of the tube 3 is a portion which is put over the end-tapered cylinder portion 4A.

In one embodiment, the invention is characterized in that the external thread portion 5 is formed also on an outer peripheral portion of the cover cylinder portion 6.

In one embodiment, the invention is characterized in that the external thread portion 5 is formed also on an outer peripheral portion of the cover cylinder portion 6.

In one embodiment, the invention is characterized in that the straight barrel cylinder portion 4B is extended to an end of the inner cylinder portion 4, the end being opposite to the end-tapered cylinder portion 4A.

In one embodiment, the invention is characterized in that both the joint body 1 and the union nut 2 are made of a fluorine resin.

Effect of the Invention

In one embodiment, although its detail will be described in the paragraph of embodiments, a sealing portion is formed in a tip end place of the inner cylinder portion, and the tube and the joint body are satisfactorily sealed without causing the fluid to enter between the inner cylinder portion and the flared portion. The flared straight portion which is externally fitted to the inner cylinder portion is pressingly contacted with the outer peripheral face of the straight barrel cylinder portion and the pressing inner peripheral portion. Therefore, a pulling force can be strongly resisted, and radial expanding deformation due to the structure where the diameter of the flared straight portion is increased due to the pulling force blocks the sliding movement in the axial direction, thereby producing a function of effectively regulating a movement in which the flared portion is moved in the axial direction and in the direction along which slipping off from the inner cylinder portion occurs. Furthermore, it is possible to visually check whether the end portion of the flared portion which is seen through the union nut is inner than that of the cover cylinder portion or not, thereby allowing to determine whether the tube is correctly inserted into the inner cylinder portion. As a result, it is possible to provide a resin pipe joint in which, although an economical configuration formed by two components or a joint body and a union nut is employed and it is possible to exert a function of indicator means which can determine whether the insertion amount of the tube is adequate or not while seeing through the union nut, both a resistance against pulling and an excellent sealing property can be attained.

In one embodiment, co-rotation of the flared portion due to fastening of the union nut does not occur, and, while preventing disadvantages such as a shift of a seal point and reduction of the resistance against pulling due to a rotation movement of the flared portion from occurring, the flared straight portion can be firmly interposed and fixed between the straight barrel cylinder portion and the pressing inner peripheral face. There is an advantage that further improvement of the resistance against pulling is enabled.

In one embodiment, it is possible to provide a resin pipe joint in which the flared straight portion that is externally fitted to the inner cylinder portion is pressingly contacted with the outer peripheral face of the straight barrel cylinder portion and the pressing inner peripheral portion and has no escaping space (expanding deformation or the like is disabled), the pressing force is strengthened to be tightly held, the slipping-off prevention pressing portion is positioned so as to press the large-diameter portion of the flaring changing region in the axial direction, and hence a function of preventing movement of the flared portion in the axial direction and in the direction along which slipping off from the inner cylinder portion occurs is enhanced, and the resistance against pulling is further improved.

In one embodiment, although its detail will be described in the paragraph of embodiments, the seal pressing portion presses the small-diameter portion of the flaring changing region, and hence a sealing portion is formed in a tip end place of the inner cylinder portion, and the tube and the joint body are satisfactorily sealed without causing the fluid to enter between the inner cylinder portion and the flared portion. The flared straight portion which is externally fitted to the inner cylinder portion is pressingly contacted with the outer peripheral face of the straight barrel cylinder portion and the pressing inner peripheral portion. Therefore, a pulling force can be strongly resisted, and radial expanding deformation due to the structure where the diameter of the flared straight portion is increased due to the pulling force blocks the sliding movement in the axial direction, thereby producing a function of effectively regulating a movement in which the flared portion is moved in the axial direction and in the direction along which slipping off from the inner cylinder portion occurs.

Furthermore, the flared straight portion that is externally fitted to the inner cylinder portion is pressingly contacted with the outer peripheral face of the straight barrel cylinder portion and the pressing inner peripheral portion and has no escaping space (expanding deformation or the like is disabled), the pressing force is strengthened to be tightly held, the slipping-off prevention pressing portion is positioned so as to press the large-diameter portion of the flaring changing region in the axial direction, and hence a function of preventing movement of the flared portion in the axial direction and in the direction along which slipping off from the inner cylinder portion occurs is enhanced, and the resistance against pulling is further improved. As a result, it is possible to provide a resin pipe joint in which, although an economical configuration formed by two components or a joint body and a union nut is employed, both a resistance against pulling and an excellent sealing property can be attained.

In addition, in the state where the pressing inner peripheral portion is pressingly contacted with and externally fitted to the flared straight portion, the slipping-off prevention pressing portion presses the large-diameter portion of the flaring changing region. Therefore, also a preferred function of positively pressing the flared straight portion into the inner deep portion is produced in accordance with fastening of the union nut, and there is an effect of contributing to more firm insertion of the tuber to a deep portion. Moreover, after start of the pressing of the large-diameter portion by the slipping-off prevention pressing portion, the pressing of the small-diameter portion by the seal pressing portion is started. Therefore, a function of pressing the flared straight portion into the inner deeper portion of the inner cylinder portion is produced by the operation of fastening the union nut, and hence can be inserted more firmly into the inner cylinder. Since the pressing contact and outer fitting of the pressing inner peripheral portion cause the tube to be in a situation where it is not easily moved into the inner deep side, a function of increasing the thickness of the flared straight portion by the pressing of the slipping-off prevention pressing portion is produced. This function enables the flared straight portion to be interposed more firmly between the straight barrel cylinder portion and the pressing inner peripheral portion, so that the resistance against pulling can be further improved.

In one embodiment, co rotation of the flared portion due to fastening of the union nut does not occur, and, while preventing disadvantages such as a shift of a seal point and reduction of the resistance against pulling due to a rotation movement of the flared portion from occurring, the flared straight portion can be firmly interposed and fixed between the straight barrel cylinder portion and the pressing inner peripheral face. There is an advantage that further improvement of the resistance against pulling is enabled.

In one embodiment, it is possible to visually check whether the end portion of the flared portion which is seen through the union nut is inner than that of the cover cylinder portion or not. Therefore, it is possible to provide a resin pipe joint in which, when the position of the tube with respect to the end portion of the cover cylinder portion is visually checked, it is possible to determine whether the tube is correctly inserted into the inner cylinder portion, i.e., it is possible to exert a function of indicator means which can determine whether the insertion amount of the tube is adequate or not while seeing through the union nut, and which is more convenient to use.

In one embodiment, external fitting and attachment to the inner cylinder portion by flaring the tube with using the end-tapered cylinder portion are easily performed, and the place where the seal pressing portion acts on the flaring changing region, and that where the slipping-off prevention pressing portion acts on the flaring changing region are separated from each other in the axial direction. The sealing function and the slipping-off preventing function are easily clearly exerted.

In one embodiment, the external thread portion and an inserted portion of the tube into the inner cylinder portion can be set to a state where they overlap with each other in the axial direction. Therefore, it is possible to provide a resin pipe joint which has an advantage that the axial length can be compactified while obtaining a screw coupling structure of the union nut and the joint body.

In one embodiment, the inner cylinder portion is formed into a straight pipe shape having a tapered tip end portion. Therefore, there is an advantage that mold shaping, cutting work, and the like are easily performed, and the productivity is excellent.

In one embodiment, both the joint body and the union nut are made of a fluorine resin having excellent chemical resistance and heat resistance. Even when the fluid is a medical solution or a chemical solution, or the fluid is a high-temperature fluid, the joint structure portion is not deformed, and leakage does not easily occur. Therefore, the good sealing property and the resistance against pulling can be maintained. A fluorine resin is preferable because it is stable at a high temperature, and has high water repellency, a low coefficient of friction, a high chemical resistance, and a high electrical insulating property. When the joint body and the union nut are formed by the same material or a fluorine resin, their linear coefficients of expansion are identical to each other, and there is an advantage that also the sealing property at a high temperature is improved.

BEST MODE FOR CARRYING OUT THE INVENTION

Figure 1:
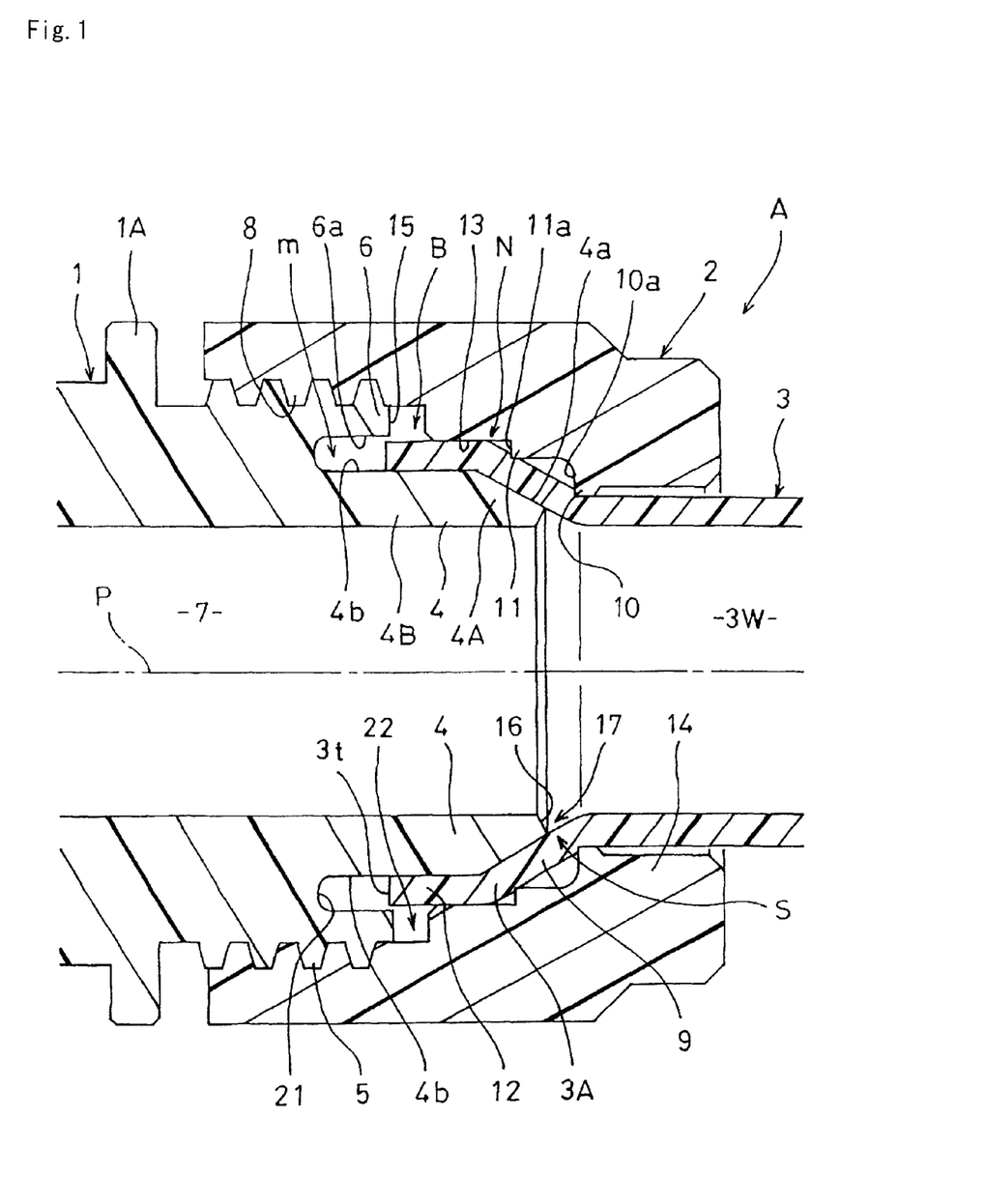
FIG. 1 is a sectional view showing the structure of a resin pipe joint of Embodiment 1.
Figure 2:
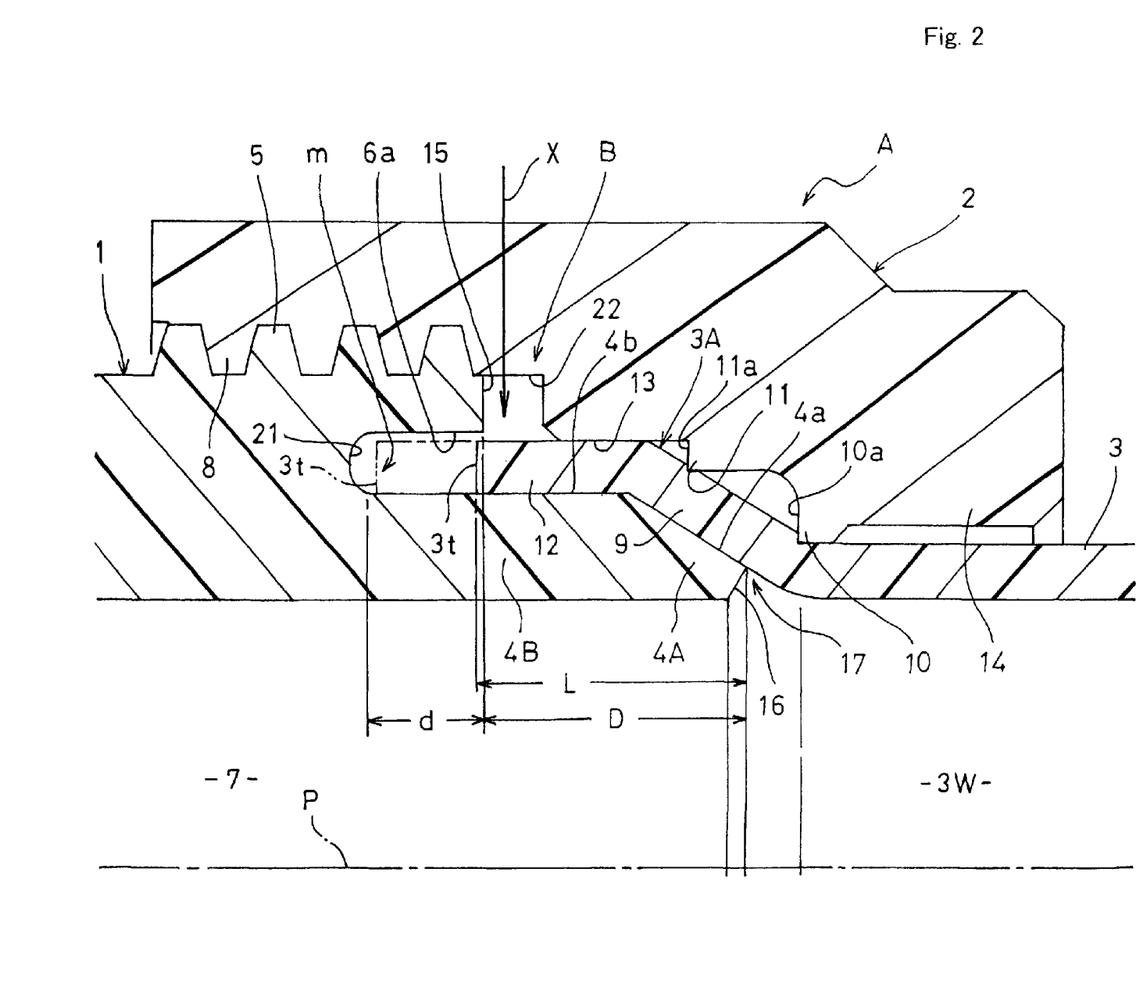
FIG. 2 is an enlarged sectional view showing main portions of FIG. 1.
Figure 3:
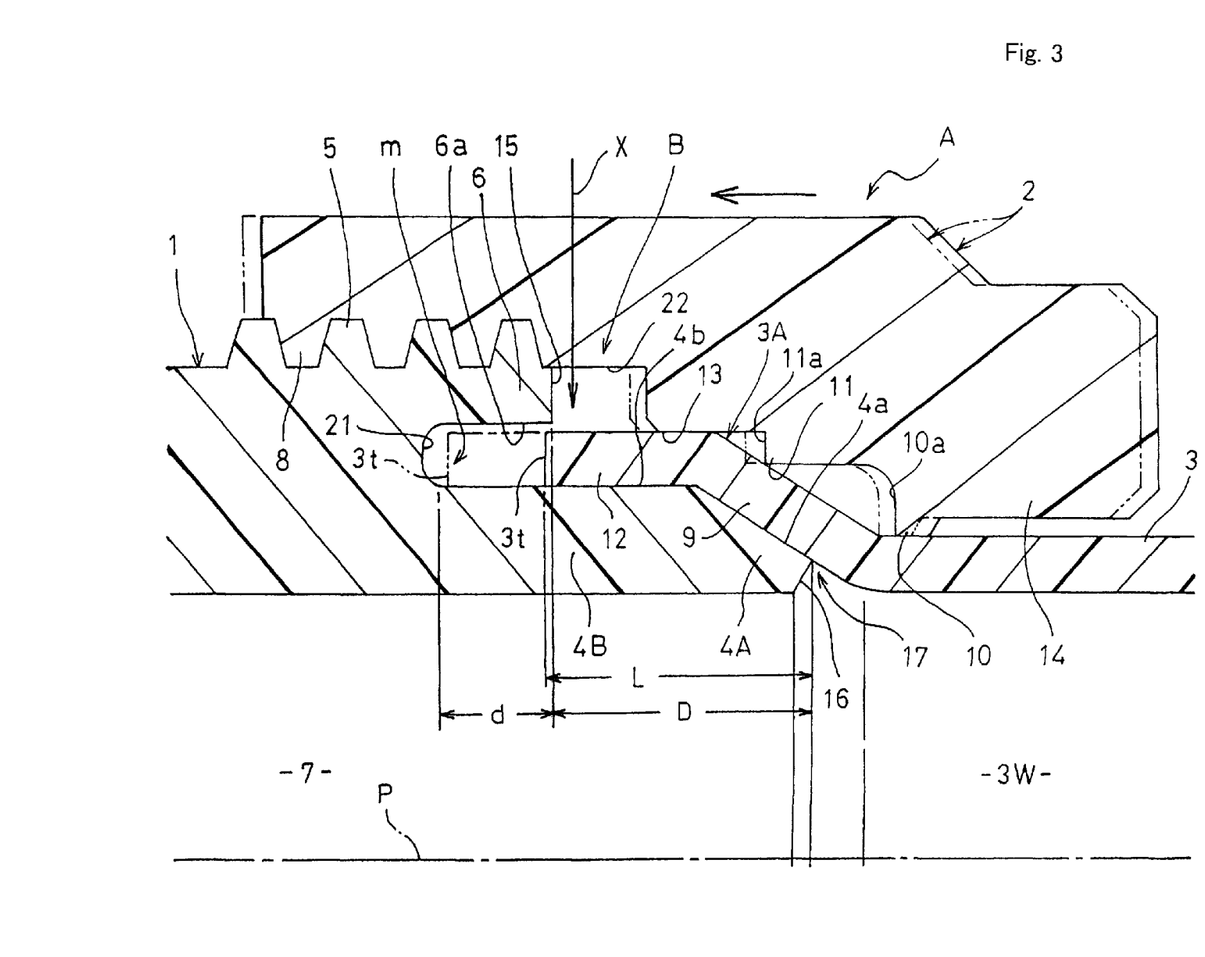
FIG. 3 is an enlarged sectional view of main portions in the middle of fastening of a union nut of a resin pipe joint of Embodiment 2.
Figure 4:
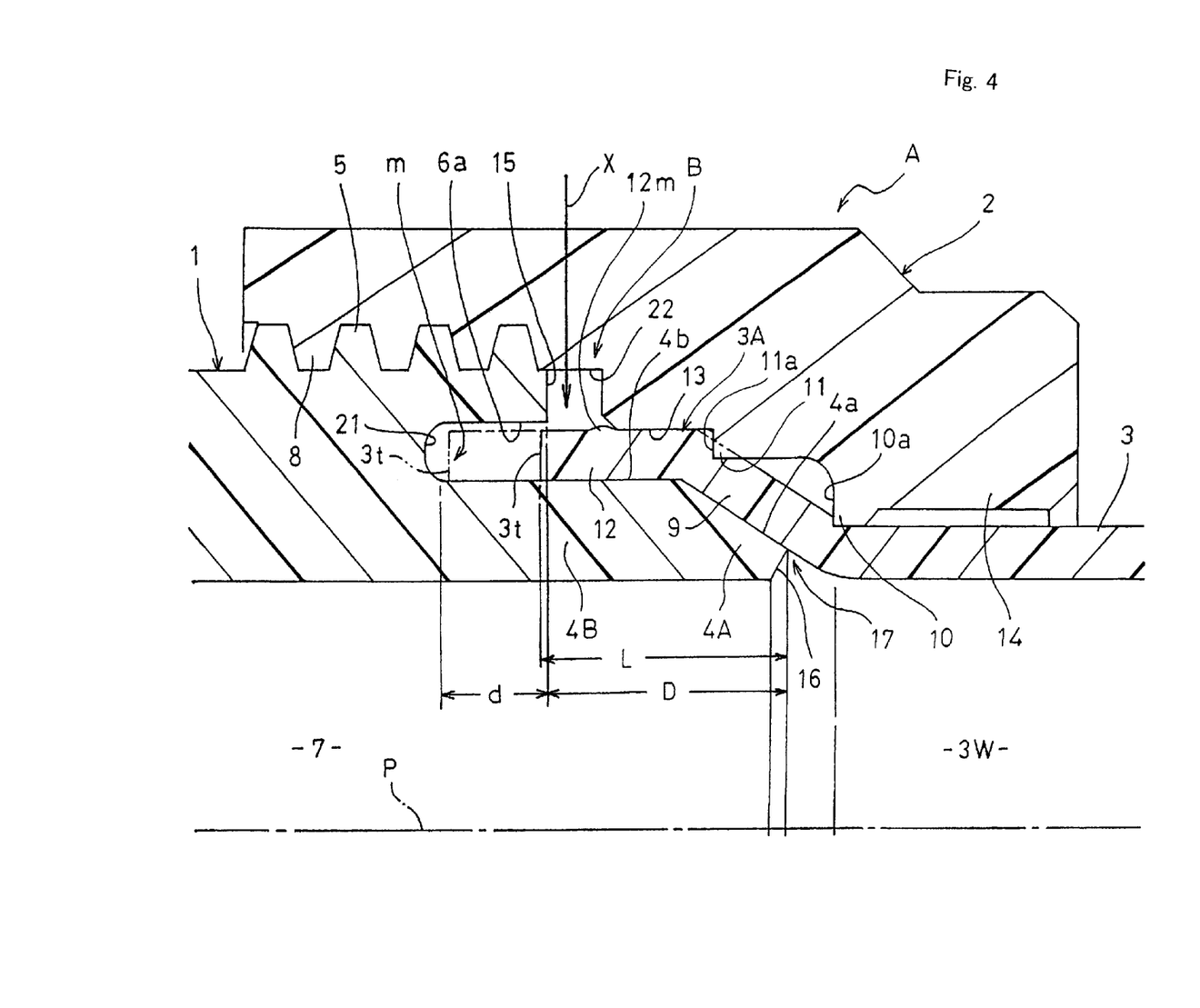
FIG. 4 is an enlarged sectional view of main portions after the fastening of the union nut in FIG. 3.
Figure 5:
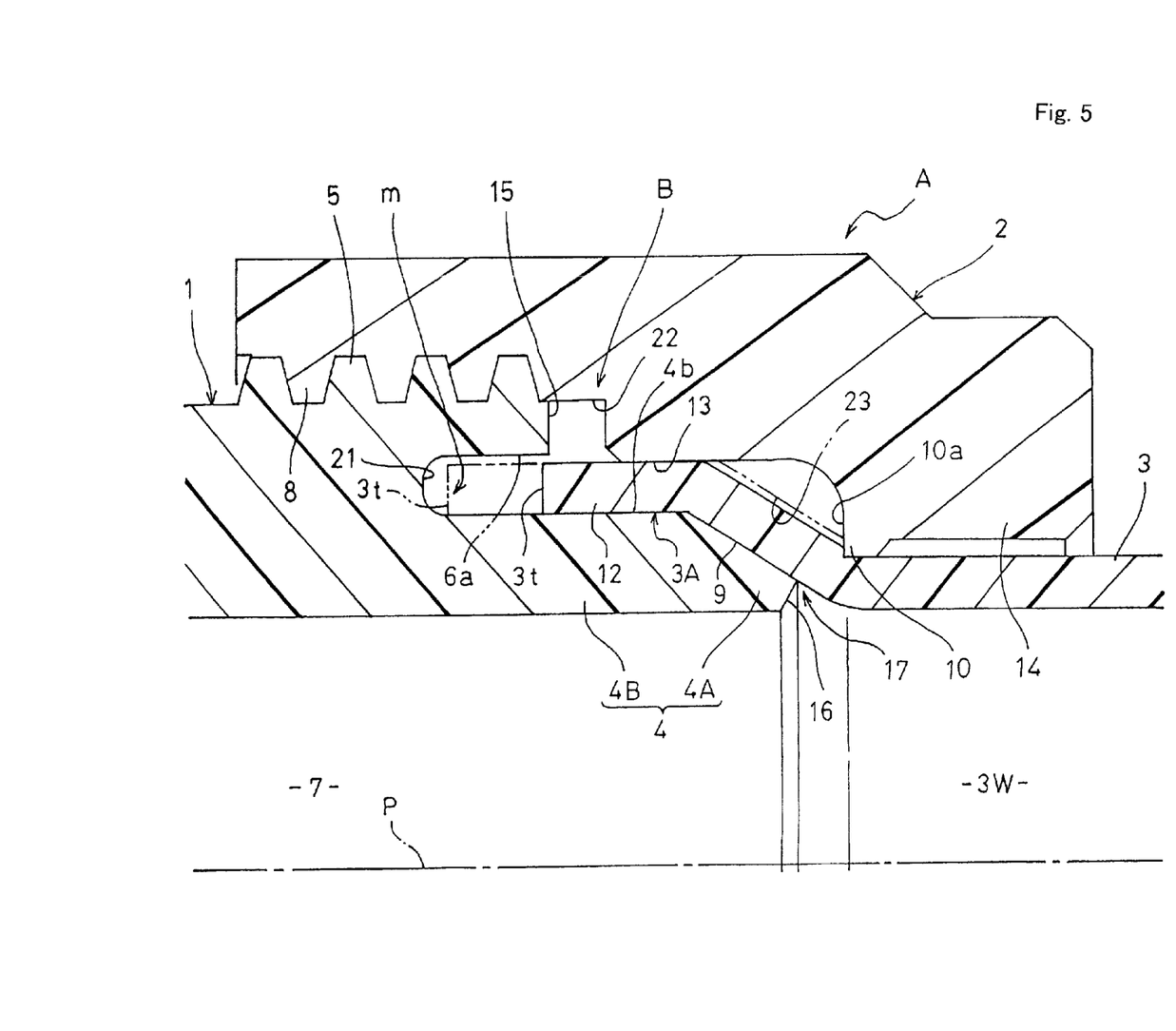
FIG. 5 is an enlarged sectional view showing main portions of a resin pipe joint of Embodiment 3.
Figure 6:
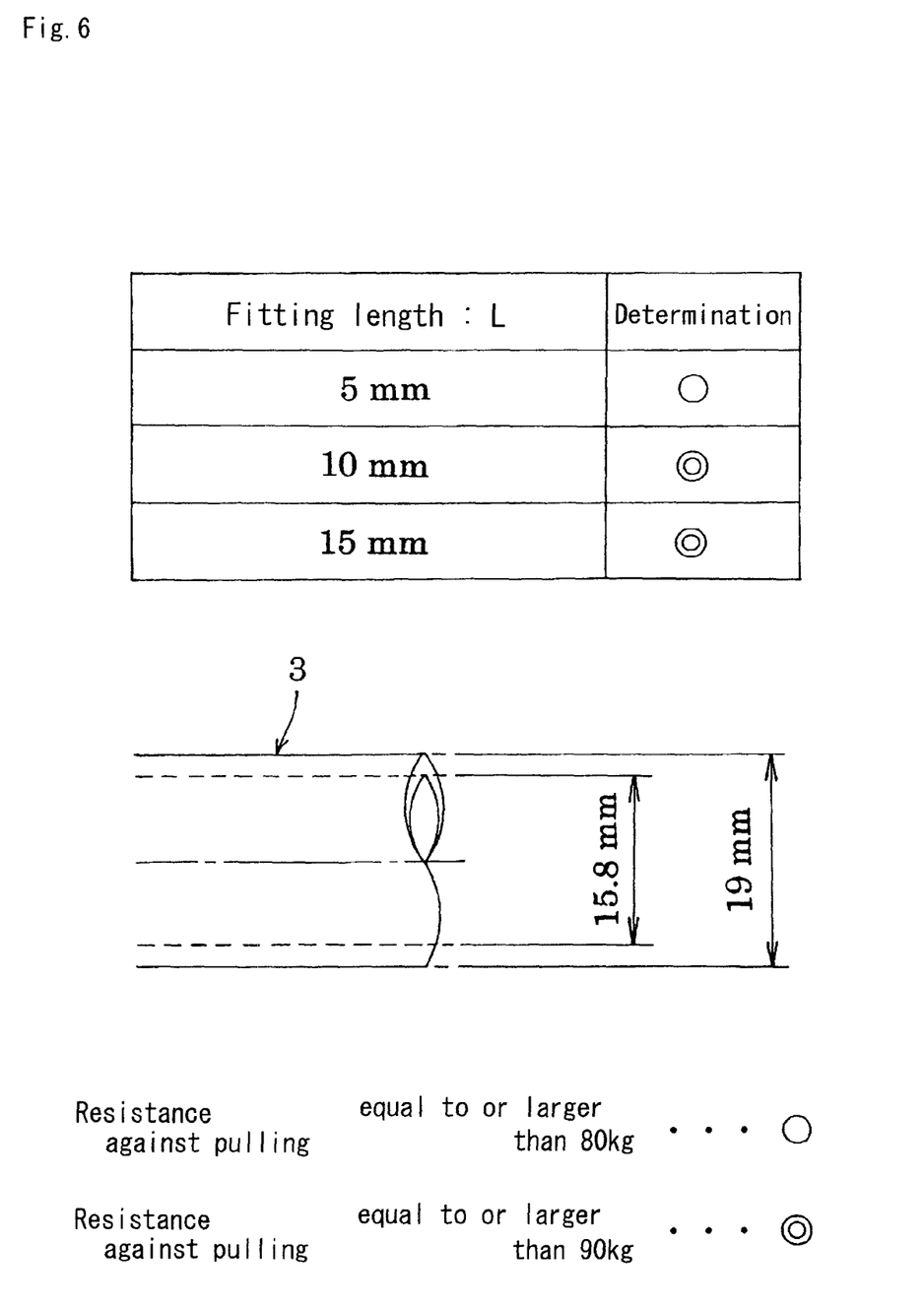
FIG. 6 is a table showing a result of a test of the resistance against pulling from an inner cylinder portion of a standard tube.

Hereinafter, embodiments of the resin pipe joint of the invention will be described with reference to the drawings. FIG. 1 is a sectional view of a resin pipe joint of Embodiment 1, FIG. 2 is an enlarged sectional view of main portions of FIG. 1, FIG. 3 is an enlarged sectional view of main portions in the middle of fastening of a union nut of a resin pipe joint of Embodiment 2, FIG. 4 is an enlarged sectional view of main portions after the fastening of the union nut in FIG. 3, FIG. 5 is an enlarged sectional view showing main portions of a resin pipe joint of Embodiment 3, and FIG. 6 is a table showing a result of a test of the resistance against pulling. In the specification, "inner deep side" defines the side which is deeper in the direction of the axis P than the questioned site (or portion), and does not always mean that the middle position of the object (example: a joint body 1) in the direction of the axis P is deepest.

Embodiment 1

As shown in FIGS. 1 and 2, a resin pipe joint A of Embodiment 1 communicatingly connects a tube 3 made of a fluorine resin (an example of a synthetic resin which is typified by PFA, PTFE, and the like) to a fluid apparatus such as a pump or a valve, or a tube of the same or different diameter, and is configured by two components or a joint body 1 made of a fluorine resin (an example of a synthetic resin which is typified by PFA, PTFE, and the like), and a union nut 2 made of a fluorine resin (an example of a synthetic resin which is typified by PFA, PTFE, and the like). The figures show an assembled state in which the union nut 2 is fastened by a predetermined degree.

As shown in FIGS. 1 and 2, the joint body 1 is formed into a cylindrical member including: an inner cylinder portion 4 having one end to which an end portion of the tube 3 can be externally fitted and attached while flaring the end portion; a cover cylinder portion 6 which is put over an outer peripheral side of an inner deep side portion of the inner cylinder portion 4 with forming a peripheral groove (an example of "radial gap") m that extends in the direction of the axis P, and that allows the tip end of the flared tube 3 to be inserted; an external thread portion 5 which is configured by a trapezoidal screw; and a fluid path 7 which is a columnar space having the axis P. The inner cylinder portion 4 is formed into a straight shape having an end-tapered cylinder portion 4A which causes the tube 3 to be gradually flared; and a straight barrel cylinder portion 4B which is formed in succession to a large-diameter side of the end-tapered cylinder portion 4A.

In the peripheral groove m, an outer peripheral face which is a peripheral face on the radially inward side is an outer peripheral face 4b of the straight barrel cylinder portion 4B, and that which is a peripheral face on the radially outward side is an inner peripheral face 6a of the cover cylinder portion 6. A joint flange 1A is formed in a place which is separated by a predetermined length in the direction of the axis P from a deep-side peripheral face 21 of the peripheral groove m. An external thread portion 5 is formed from a substantially base place of the joint flange 1A to the outer peripheral face of an end portion of the cover cylinder portion 6. The tip end face of the inner cylinder portion 4 is formed by a reverse taper angle which, as advancing toward the radially inner side, is closer to the inner deeper side (the deeper side in the direction of the axis P). Namely, a cut face 16 in which the diameter is larger as further advancing toward the tip end is formed, and the shape of a liquid pool peripheral portion 17 formed by expandingly displacing the inner peripheral face of the tube 3 toward the flared portion is made to have an inner-peripheral side flared shape, so that the fluid hardly stagnates in the liquid pool peripheral portion 17. The cut face 16 is formed so that its maximum diameter has a substantially intermediate value between the inner and outer diameters of the tube 3 in a natural state. However, the value is not limited to this.

As shown in FIGS. 1 and 2, the union nut 2 includes: an internal thread portion 8 which is screwable with the external thread portion 5; a seal peripheral edge (an example of a seal pressing portion) 10 which is actable on a small-diameter end portion (an example of "small-diameter portion") of a flaring changing region 9 in a flared portion 3A of the tube 3, the flared portion being externally fitted to the inner cylinder portion 4; a slipping-off prevention peripheral edge (an example of a slipping-off prevention pressing portion) 11 which is actable on a large-diameter end portion (an example of "large-diameter portion") of the flaring changing region 9; a pressing inner peripheral portion 13 which is externally fittable to a flared straight portion 12 of the flared portion 3A, the flared straight portion surrounding the constant-diameter straight barrel cylinder portion 4B; and a guide cylinder portion 14 which surrounds the tube 3 over a predetermined length in the direction of the axis P in succession to the seal peripheral edge 10.

In the seal peripheral edge 10, the inner diameter is substantially equal to the outer diameter of the tube 3, and a pressing face 10a is formed as a side peripheral face which is perpendicular to the axis P. In the slipping-off prevention peripheral edge 11, the diameter of the inner peripheral face is set to a value which is larger than the diameter of the outer peripheral face 4b of the straight barrel cylinder portion 4B which has the maximum diameter in the inner cylinder portion 4, and smaller than a diameter to which the thickness of the tube 3 is added, i.e., the diameter of the pressing inner peripheral portion 13, but may not have such a value (for example: smaller than the diameter of the outer peripheral face 4b) as far as it acts on the large-diameter portion of the flaring changing region 9. Also a pressing face 11a of the slipping-off prevention peripheral edge 11 is a side peripheral face which is perpendicular to the axis P.

The pressing inner peripheral portion 13 is set to a value at which it is press-inserted (pressingly contacted with and externally fitted) to the flared straight portion 12 in a degree in which a radial gap is not formed between the pressing inner peripheral portion and the flared straight portion 12, and co-rotation of the flared portion 3A due to fastening of the union nut 2 does not occur, and slipping-off preventing means N is configured. This is conducted in order that the fastening of the union nut 2 causes the slipping-off prevention peripheral edge 11 to press the flared straight portion 12 so as to bite in the axial direction in order to block slipping off of the tube 3, and relief deformation in which the flared straight portion 12 is radially outward expanded is prevented from occurring by the pressing force, thereby obtaining the enhanced resistance against pulling due to cooperation with the slipping-off prevention pressing portion 11.

Next, the end portion of the tube 3 is externally fitted and inserted into the inner cylinder portion 4 by forcibly pushing the tube 3 at normal temperature to be attached while being flared, by heating the tube with using a heating source so as to be easily expandingly deformed and then pushing it, or by previously flaring the tube end with using a flaring machine (not shown) and then pushing it into the inner cylinder portion 4, so that a state where the tube is inserted until the tube end 3t is positioned deeper than the end wall 15 of the cover cylinder portion 6 is obtained as shown in FIG. 1. As shown in FIGS. 1 and 2, the flared portion 3A which is externally fitted and attached to the inner cylinder portion 4 is configured by the flaring changing region 9 which is externally fitted to the outer peripheral face 4a of the end-tapered cylinder portion 4A, and the flared straight portion 12 which is externally fitted to the outer peripheral face 4b of the straight barrel cylinder portion 4B.

As shown in FIGS. 1 and 2, namely, it is set so that, by a screw advancement in the direction of the axis P of the joint body 1, the screw advancement being caused by the fastening of the union nut 2 due to screwing of the internal thread portion 8 to the external thread portion 5 in a state where the tube 3 is externally fitted and attached to the inner cylinder portion 4, the pressing inner peripheral portion 13 is externally fitted to the flared straight portion 12, a portion of the large-diameter portion of the flaring changing region 9 is pressed in the direction of the axis P by the slipping-off prevention peripheral edge 11, the diameter of the portion being larger than that of the inner cylinder portion 4, and the small-diameter portion of the flaring changing region 9 is pressed in the direction of the axis P by the seal peripheral edge 10. The diameter of a fluid transfer path 3W of the tube 3, and that of the fluid path 7 are set to be equal to each other in order to attain a smooth fluid flow. Alternatively, the diameters may be different from each other.

In this case, as described above, the state is formed where a gap is not formed in a radial direction between the pressing inner peripheral portion 13 and the flared straight portion 12, and the flared straight portion 12 is pressingly contacted with and interposed between the straight barrel cylinder portion 4B and the pressing inner peripheral portion 13. In Embodiment 1, the flaring changing region 9 of the tube 3 is formed as a portion which is put over the end-tapered cylinder portion 4A. The flaring changing region 9 is in a state of a tapered pipe which is gradually flared, and the seal peripheral edge 10 and the slipping-off prevention peripheral edge 11 are in positional relationships in which they are separated from each other in the direction of the axis P. As the angle formed by the outer peripheral face 4a of the end-tapered cylinder portion 4A and the axis P is steeper, the distance between the seal peripheral edge 10 and the slipping-off prevention peripheral edge 11 in the direction of the axis P is shorter. The seal peripheral edge 10 and the tip end of the inner cylinder portion 4 are slightly separated from each other in the direction of the axis P (see FIG. 2 and the like). When the angle of the outer peripheral face 4a is steep, the separation distance is increased, and, when the angle is gentle, the separation distance is decreased.

As shown in FIGS. 1 and 2, in the predetermined assembled state of the resin pipe joint A, the seal peripheral edge 10 presses the small-diameter portion of the flaring changing region 9 of the tube 3 in the direction of the axis P, and hence the end of the small-diameter side of the outer peripheral face 4a of the flaring changing region 9, and the inner peripheral face of the tube 3 adjoining the place are strongly pressingly contacted, and a sealing portion S is formed. The sealing portion S in the tip end place of the inner cylinder portion 4 enables the tube 3 and the joint body 1 to be satisfactorily sealed without causing a fluid such as a washing solution or a medical solution to enter between the inner cylinder portion 4 and the flared portion 3A.

The flared straight portion 12 of the flared portion 3A which is pressingly externally fitted to the inner cylinder portion 4 is surrounded by the outer peripheral face 4b of the straight barrel cylinder portion 4B and the pressing inner peripheral portion 13, and held so as not to be expandingly deformed, and the slipping-off prevention peripheral edge 11 is positioned so as to substantially bite the flared straight portion 12. This can resist a pulling force which is acted on the flared portion 3A by engagement of the slipping-off prevention peripheral edge 11 which presses the flared straight portion 12 so as to bite the large-diameter portion of the flaring changing region 9, i.e., substantially the flared straight portion 12, and can brake and block a sliding movement of the flared portion 3A in the slipping-off direction due to that the flared straight portion 12 can be expandingly deformed in a radial direction by the pulling force while using the slipping-off prevention peripheral edge 11 as the basing point. Even when the flared portion 3A is slightly slidingly moved in the direction of the axis P, also the seal point in the sealing portion S is shifted, and there is a possibility that the sealing function becomes uncertain. This can be prevented from occurring. Therefore, the slipping-off preventing means N for strongly regulating a movement in the direction of the axis P and in the direction along which the flared portion 3A slips off from the inner cylinder portion 4 is configured, thereby realizing an excellent resistance against pulling. As a result, the flare type resin pipe joint A configured by the joint body 1 and the union nut 2 is realized as an improved configuration which can be simply assembled by a nut operation in a state where the tube is attached to the inner cylinder portion, thereby attaining an excellent assembling property, and both the excellent sealing property due to the sealing portion S, and the high resistance against pulling due to the slipping-off preventing means N can be attained.

As shown in FIGS. 1 and 2, indicator means B which can visually check whether the tube 3 is correctly inserted into the inner cylinder portion 4 or not is configured by: the peripheral groove m that is formed by the inner deep side of the inner cylinder portion 4, and the cover cylinder portion 6; and the union nut 2 that is formed by a transparentable fluorine resin. In the case where viewing is conducted along a line (see the arrow X in FIG. 2) which passes a valley-like inner peripheral face 22 that is on the inner deep side of the pressing inner peripheral portion 13, and that extends to the internal thread portion 8, when the normal state where the flared portion 3A is seen and the flared end portion 3t is not seen is obtained, it is possible to determine that the tube 3 is correctly externally fitted and attached to the inner cylinder portion 4. When a mal-insertion state where the flared portion 3A is seen and the flared end portion 3t is seen is obtained, or when an insufficient insertion state where the flared portion 3A itself is not seen is obtained, it is possible to determine that the insertion of the tube 3 does not reach a specified amount. In this case, an operation of further pressing the tube 3 is performed until the above-described normal state can be seen.

In the indicator means B, the union nut 2 is formed by using a transparent or translucent (opalescent or the like) fluorine resin, and an object thereinside can be visually checked. In viewing along the line (see the arrow X in FIG. 2) which passes the valley-like inner peripheral face 22 that is on the inner deep side of the pressing inner peripheral portion 13, and that extends to the internal thread portion 8, particularly, the flared portion 3A can be visually checked in a relatively clear manner by see-through of only the reduced-thickness portion of the union nut 2. In the region of the pressing inner peripheral portion 13 which is thicker than the region of the valley-like inner peripheral face 22, by contrast, the visuality of the flared portion 3A is inferior, and it is hardly seen.

In the portion of the peripheral groove m into which the end portion of the tube 3 can enter, the union nut 2 and the cover cylinder portion 6 overlap with each other. Although also the joint body 1 is transparentable, the thickness is larger than that of the portion of the valley-like inner peripheral face 22, and also a change of the refractive index in the interface caused by the overlap of the external thread portion 5 and the internal thread portion 8 is added, so that it is substantially impossible to visually check where the flared end portion 3t is positioned. In the case where the joint body 1 is untransparentable because of coloring or the like, it is a matter of course that, in the side of the cover cylinder portion 6 which is deeper than the end wall 15, the flared portion 3A and the flared end portion 3t cannot be seen.

Therefore, it is possible to provide the resin pipe joint A in which the function of the indicator means B determining whether the normal state where the flared portion 3A is seen from the valley-like inner peripheral face 22 and the flared end portion 3t is not seen can be visually checked or not allows a visual check to be performed in the assembled state after the union nut 2 is fastened, and which has excellent convenience of use.

Because of the existence of the peripheral groove m and cover cylinder portion 6 for constituting the indicator means B, it is possible to attain also an effect that it functions also as an indicator in the case where the tube 3 is inserted into the inner cylinder portion 4. Namely, it is possible to check whether the amount of insertion of the tube 3 into the inner cylinder portion 4 after being flared reaches a predetermined amount or not. In other words, it is requested that the end portion 3t which is inserted into the inner cylinder portion 4, and which functions as the flared portion 3A exists deeper than the end wall 15, and there is an advantage that it functions also as means for visually checking and determining whether it is good or not, when the tube 3 is assembled to the inner cylinder portion 4.

Here, the fitting length of the flared portion 3A into the inner cylinder portion 4 in the direction of the axis P is indicated by L (the flared fitting length L), the distance from the tip end of the inner cylinder portion 4 to the end wall 15 of the cover cylinder portion 6 is indicated by D (the minimum fitting length D), and the maximum tube fitting length of the peripheral groove m is indicated by d (the adjusted fitting length d). The flared fitting length L is requested to be set to be equal to or longer than the minimum fitting length D, and equal to or shorter than the length which is obtained by adding the adjusted fitting length d to the minimum fitting length D. This can be known by the indicator means B also after the union nut 2 is fastened. When $D \leq L \leq (D+d)$, namely, the amount of insertion of the tube 3 into the inner cylinder portion 4 is adequate.

FIG. 6 shows a result of a test to check the degree of a force in the direction of the axis P by which, in the state where the slipping-off prevention peripheral edge 11 is not caused to function and the tube 3 is inserted into the inner cylinder portion 4, the tube 3 is caused to slip off from the inner cylinder portion 4. The test was conducted by using the tube 3 having a standard diameter. In the case where a tube having an inner diameter of 15.8 mm and an outer diameter of 19 mm was used as an example of the standard diameter was used, a result that, when L=5 mm, the pullout force is ○, when L=10 mm, the pullout force is ◉, and even when L=15 mm, the pullout force is ◉ was obtained. When the resistance against pulling is equal to or larger than 80 kg, the determination is ○, and, when equal to or larger than 90 kg, the determination is ◉. From the above, when L is 10 mm at the minimum, an excellent resistance against pulling can be realized, and hence $L \geq 10$ mm is obtained. In this case, there is no upper limitation of L. Then, the peripheral groove m is excessively prolonged, and the axial length of the pipe joint is enlarged.

In order to cut the tube 3 at an adequate length, a cutting tool is used for correct cutting. However, it is usual that the tube is cut by an ordinary worker while using scissors. In this case, it is often that the cut edge is not correctly perpendicular to the axis of the tube, and the tube is obliquely cut. It is known from data that dispersion of the position in the axial direction of the cut face formed by the oblique cutting is approximately 5 mm at the maximum. When the substantial depth (the length in the direction of the axis P) of the peripheral groove, i.e., d=5 and $L \leq 15$ mm and as a result 10 mm$\leq L$ mm$\leq 15$ mm (D=10 mm, D+d=15 mm) is set, therefore, it is possible to fit the tube 3 and the inner cylinder portion 4 together in a state where a sufficient resistance against pulling is provided, while considering both that the cut face of the tube 3 is oblique, and that the length in the direction of the axis P of the pipe joint is reduced as far as possible.

Even when, as shown by the solid line in FIGS. 1 and 2, the position in the direction of the axis P of the flared end portion 3t is slightly deeper than the end wall 15 of the cover cylinder portion 6, therefore, the insertion amount of the tube 3 into the inner cylinder portion 4 is acceptable. As shown by the phantom line in FIG. 2, the position may enter in the vicinity of the inner deep end of the peripheral groove m. It is a matter of course that, when L<D, the insertion is insufficient, and the tube 3 must be further pressed. The above-described specific lengths such as 10 mm and 15 mm are absolutely embodiments. An actual value is adequately determined while considering conditions such as the material, diameter, and thickness of the tube 3 and the flaring amount to the inner cylinder portion 4.

Embodiment 2

As shown in FIG. 3, a resin pipe joint A of Embodiment 2 is identical with the resin pipe joint A of Embodiment 1 except that it is set to a state where, after start of the pressing of the large-diameter portion of the flaring changing region 9 by the slipping-off prevention peripheral edge 11, the pressing of the small-diameter portion of the flaring changing region 9 by the seal peripheral edge 10 is started (i.e., it has pressing time difference means). Description of the same places is deemed to be performed by denoting the places by the identical reference numerals. The pressing time difference means provides the following functions and effects. Namely, as shown in FIG. 3, when the union nut 2 is turned and fastened (screw advanced), the slipping-off prevention peripheral edge 11 first butts against the flaring changing region 9 (in detail, the large-diameter portion of the flaring changing region 9), and at this time the seal peripheral edge 10 does not reach the flaring changing region 9. Therefore, only the slipping-off prevention peripheral edge 11 presses in the direction of the axis P the large-diameter portion of the flaring changing region 9, in more detail, the portion in which the diameter is larger than that of the straight barrel cylinder portion 4B, and hence a function of pressing the flaring straight portion 12 into the inner deeper portion of the inner cylinder portion 4 is produced by the operation of fastening the union nut 2.

The flaring straight portion 12 which is pressingly inserted into and externally fitted to the straight barrel cylinder portion 4B butts also against the pressing inner peripheral portion 13. In the case where the press contact force is relatively weak, the portion tries to slide the flared portion 3A so as to be inserted into the inner deeper side of the inner cylinder portion 4. Therefore, preferred effects are obtained such as that the tube is inserted into the joint body 1 more surely, and that the flaring straight portion 12 which is pressed in the direction of the axis P is hardly moved in the direction of the axis P, and hence tries to radially expand to further enhance the press contact force, thereby producing a function of being firmly interposed. In the case where the press contact force is relatively strong, the flaring straight portion 12 which is pressed in the direction of the axis P is substantially immobile in the direction of the axis P, and hence a strong function of radially expanding is produced, thereby obtaining an effect that the flared straight portion 12 is held more firmly between the inner cylinder portion 4 and the pressing inner peripheral portion 13.

Anyway, the slipping-off prevention peripheral edge 11 presses the flared portion 3A in the direction of the axis P under the situation where the seal peripheral edge 10 does not exert a function of sticking in the flared portion 3A, thereby obtaining an effect that the press contacting and holding force of the flared straight portion 12 due to the straight barrel cylinder portion 4B and the pressing inner peripheral portion 13 is enhanced. As shown in FIG. 4, for example, even phenomena occur such as that the portion of the flared portion 3A which is pressed by the slipping-off peripheral edge 11 flows to the radially outward side to fill an edge space portion formed by the pressing face 11a and the pressing inner peripheral portion 13, and that the portion in which the restraint to the radially outward side by the pressing inner peripheral portion 13 is cancelled expands radially outward and a raised portion 12m is formed.

As described above, the pressing time difference means produces the effect that the press contacting and holding force applied to the inner cylinder portion 4 by the tube 3, and resistance against pulling are further improved. The union nut 2 which is indicated by the phantom line in FIG. 3 shows a state where the seal peripheral edge 10 reaches the flaring changing region 9 (in detail, the small-diameter portion of the flaring changing region 9). In this state, the slipping-off prevention peripheral edge 11 already clearly bites the flaring changing region 9.

Embodiment 3

As shown in FIG. 5, a resin pipe joint A of Embodiment 3 is identical with the resin pipe joint A of Embodiment 1 except that the union nut 2 in which the slipping-off prevention peripheral edge 11 is omitted is used. Description of the same places is deemed to be performed by denoting the places by the identical reference numerals. Namely, the flaring straight portion 12 which is pressingly externally fitted to the straight barrel cylinder portion 4B is firmly held by the pressing inner peripheral portion 13 so as to be disabled to be expandingly deformed. This is a structure which is preferred in the case where a sufficient resistance against pulling is produced even when the slipping-off prevention peripheral edge 11 is not formed.

Since there is no contact between the slipping-off prevention peripheral edge 11 and the flared portion 3A, there is an advantage that the burden of the operation of fastening the union nut 2 is lightened as compared with that in Embodiment 1. A resin pipe joint A may be employed in which, as indicated by the phantom line in FIG. 5, the inner peripheral portion in the union nut 2 between the seal peripheral edge 10 and the pressing inner peripheral portion 13 is formed into an inclined inner peripheral face 23 that extends along and in the vicinity of the tube outer periphery of the flaring changing region 9, and it is improved so that the flaring changing region 9 is not or hardly expandingly deformed toward the radially outward side by the pressing force of the seal peripheral edge 10 to form the sealing portion S.

Other Embodiment 1

The seal pressing portion 10 and the slipping-off prevention pressing portion 11 may be configured by intermittent peripheral edges which are formed by division into a plurality of peripheral portions, or the angle of the edge portion in a sectional shape may be an angle which is other than 90 deg. (right angle) shown in FIG. 2 and the like, such as 80 deg. or 100 deg. The outer peripheral face 4b of the straight barrel cylinder portion 4B, and the pressing inner peripheral portion 13 are parallel to each other. Alternatively, a small relative angle may be formed as far as in the range where radial outward expanding deformation of the flared straight portion 12 by the pressing force of the slipping-off prevention pressing portion 11 does not occur. The inner diameter of the guide cylinder portion 14 may be equal to that of the seal peripheral edge 10.

As the synthetic resin, various resins such as PEEK (polyether ether ketone) and PP (polypropylene) may be used in addition to a fluorine resin. As a fluorine resin, various resins such as PTFE, PFA, PVDF, and ETFE may be useful.

Other Embodiment 2

Although not illustrated, a resin pipe joint having the joint body 1 having a configuration which is not provided with the peripheral groove/radial gap m and the cover cylinder portion 6 may be employed.

DESCRIPTION OF REFERENCE NUMERALS 1 joint body
2 union nut
3 tube
3A flared portion
4 inner cylinder portion
4A end-tapered cylinder portion
4B straight barrel cylinder portion
5 external thread portion
6 cover cylinder portion
8 internal thread portion
9 flaring changing region
10 seal peripheral edge
11 slipping-off prevention edge
12 flared straight portion
13 pressing inner peripheral portion
P axis
m peripheral groove/radial radial gap

The invention claimed is:
1. A resin pipe joint comprising:
a synthetic resin-made joint body including an inner cylinder portion to which an end portion of a synthetic resin-made tube is externally fittable and attachable while being flared, and an external thread portion; and a synthetic resin-made union nut including: an internal thread portion which is screwable with said external thread portion; a first pressing portion which is actable on a small-diameter portion of a flaring changing region in a flared portion of said tube, said flared portion being externally fitted to said inner cylinder portion; a second pressing portion which is actable on a large-diameter portion of said flaring changing region; and a pressing inner peripheral portion which is externally fittable to a flared straight portion of said flared portion, and wherein said resin pipe joint is configured so that, by a screw advancement of said union nut in a direction of an axis of said joint body, the screw advancement being caused by screwing said internal thread portion to said external thread portion in a state where said tube is externally fitted and attached to said inner cylinder portion and said flared portion is formed, said pressing inner peripheral portion is pressingly contacted with and externally fitted to said flared straight portion, said large-diameter portion of said flaring changing region is pressed in the direction of the axis by said second pressing portion, and said small-diameter portion of said flaring changing region is pressed in the direction of the axis by said first pressing portion, and set so that, after start of the pressing of said large-diameter portion of said flaring changing region by said second pressing portion, the pressing of said small-diameter portion of said flaring changing region by said first pressing portion is started, said inner cylinder portion including an end-tapered cylinder portion and a constant-diameter straight barrel cylinder portion which is formed in succession to a large-diameter side of the end-tapered cylinder portion, a pressing face is formed on the second pressing portion, an inner diameter of the pressing face is formed to be larger than a maximum diameter of a cylindrical shape of the inner cylinder portion and smaller than a diameter of an inner peripheral face of the pressing inner peripheral portion, the pressing face being perpendicular to the axis; and when the joint is assembled with a tube, said flaring changing region is put over said end-tapered cylinder portion, and said flared straight portion of said flared portion is externally fitted to said straight barrel cylinder portion.

2. A resin pipe joint according to claim 1, wherein said pressing inner peripheral portion is pressingly contacted with and externally fitted to said flared straight portion in a degree in which a radial gap is not formed between said pressing inner peripheral portion and said flared straight portion, and co-rotation of said flared portion due to fastening of said union nut does not occur.

3. A resin pipe joint according to claim 2, wherein a cover cylinder portion which covers said inner cylinder portion and forms a radial gap that allows said tube to be inserted is formed in said joint body, and said union nut is made of a transparent synthetic resin.

4. A resin pipe joint according to claim 1, wherein a cover cylinder portion which covers said inner cylinder portion and forms a radial gap that allows said tube to be inserted is formed in said joint body, and said union nut is made of a transparent synthetic resin.

5. A resin pipe joint according to claim 4, wherein said external thread portion is formed also on an outer peripheral portion of said cover cylinder portion.

6. A resin pipe joint according to claim 1, wherein said end-tapered cylinder portion of said inner cylinder portion causes said tube to be gradually flared.

7. A resin pipe joint according to claim 1, wherein said straight barrel cylinder portion is extended to an end of said inner cylinder portion, said end being opposite to said end-tapered cylinder portion.

8. A resin pipe joint according to claim 1, wherein both said joint body and said union nut are made of a fluorine resin.

9. A resin pipe joint according to claim 1, wherein said first pressing portion is a first peripheral edge comprising a first pressing face, the first pressing face is perpendicular to the axis of said joint body, and said second pressing portion is a second peripheral edge comprising a second pressing face, the second pressing face is perpendicular to the axis of said joint body.

10. A resin pipe joint according to claim 9, wherein said resin pipe joint is configured so that, by screw advancement of said union nut in the direction of the axis of said joint body, said second peripheral edge is in contact with said flaring changing region while the first peripheral edge is not in contact with said flaring changing region, and then by further screw advancement of said union nut in the direction of the axis of said joint body, said second peripheral edge presses said flaring changing region and the first peripheral edge is in contact with said flaring changing region.

11. A resin pipe joint according to claim 1, wherein said resin pipe joint is configured so that, by screw advancement of said union nut in the direction of the axis of said joint body, said second pressing portion is in contact with said flaring changing region while the first pressing portion is not in contact with said flaring changing region, and then by further screw advancement of said union nut in the direction of the axis of said joint body, said second pressing portion presses said flaring changing region and the first pressing portion is in contact with said flaring changing region.

12. A resin pipe joint according to claim 1, wherein the resin pipe joint consists of:

the synthetic resin-made joint body;

the synthetic resin-made tube; and the synthetic resin-made union nut.

* * * * *